United States Patent
Snyder, II et al.

(10) Patent No.: US 9,977,737 B2
(45) Date of Patent: May 22, 2018

(54) METHOD AND AN APPARATUS FOR MEMORY ADDRESS ALLIGNMENT

(71) Applicant: Cavium, Inc., San Jose, CA (US)

(72) Inventors: Wilson Parkhurst Snyder, II, Holliston, MA (US); Anna Karen Kujtkowski, Rochdale, MA (US)

(73) Assignee: Cavium, Inc., San Jose, CA (US)

( * ) Notice: Subject to any disclaimer, the term of this patent is extended or adjusted under 35 U.S.C. 154(b) by 25 days.

(21) Appl. No.: 14/140,494

(22) Filed: Dec. 25, 2013

(65) Prior Publication Data
US 2015/0178195 A1    Jun. 25, 2015

(51) Int. Cl.
*G06F 12/06* (2006.01)

(52) U.S. Cl.
CPC .............................. *G06F 12/0646* (2013.01)

(58) Field of Classification Search
CPC .................................................. G06F 12/0646
See application file for complete search history.

(56) References Cited

U.S. PATENT DOCUMENTS

| | | | | |
|---|---|---|---|---|
| 5,335,332 A * | 8/1994 | Christopher, Jr. | ...... | G06F 7/785 711/201 |
| 7,111,092 B1 * | 9/2006 | Mitten | ................ | G06F 13/4221 710/22 |
| 2002/0156990 A1 * | 10/2002 | Chen | ...................... | G06F 9/3552 711/219 |
| 2004/0034742 A1 * | 2/2004 | Field | ................... | G06F 12/0223 711/132 |
| 2004/0123038 A1 * | 6/2004 | Shami et al. | ................. | 711/132 |

OTHER PUBLICATIONS

StackOverflow "How to align a pointer in C". Post answered by Johnathan Leffler on Jan. 30, 2011. Also available at <http://stackoverflow.com/questions/4840410/how-to-align-a-pointer-in-c>.*

Chassaing, Rulph. "Digital Signal Processing: Laboratory Experiments Using C and the TMS320C31 DSK", 1999, Wiley-Interscience Publication, vol. 1, pp. 37-39.*

* cited by examiner

*Primary Examiner* — Ann J. Lo
*Assistant Examiner* — Jane Wei
(74) *Attorney, Agent, or Firm* — pkalousek.ip

(57) ABSTRACT

A method and a system embodying the method for a memory address alignment, comprising configuring one or more naturally aligned buffer structure(s); providing a return address pointer in a buffer of the one or more naturally aligned buffer structure(s); determining a configuration of the one of the one or more naturally aligned buffer structure(s); applying a modulo arithmetic to the return address and at least one parameter of the determined configuration; and providing a stacked address pointer determined in accordance with the applied modulo arithmetic, is disclosed.

15 Claims, 3 Drawing Sheets

METHOD AND AN APPARATUS FOR MEMORY ADDRESS ALLIGNMENT

BACKGROUND

1. Field

The present disclosure relates to memory management. More particularly, this invention is directed toward memory address alignment.

2. Description of Related Technology

Presently, many devices are utilizing a processor to carry out some of the functions of the system. Such devices may comprise a general purpose computer, a network processor, a network interface card, and other systems known to a person having ordinary skills in the art. To enable a processor to carry out the function, a memory communicatively coupled with the processor is provided, to hold various data, e.g., instructions executed by the processor, data to be processed, temporary data, and other data.

To support management of the memory, usually a hardware based page allocator (hereinafter free page allocator (FPA)) is provided. The FPA uses a data structure (hereinafter logical stack), e.g., a linked list, heap, containing a series of pointers to free memory. There may be a plurality of logical stacks in an FPA to provide quality of service, virtualization, or other features. A hardware or a software entity receives pointers by requesting a pointer from the FPA. The FPA reads (hereinafter popped) a pointer from one of the plurality of the logical stacks. The pointer points to a base address of a portion of a memory (hereinafter buffer) that the entity can use for some purpose. When the buffer is no longer required, the entity returns a return address pointer (RAP) to the FPA to return to the logical stack, for eventual reuse by another entity. Because of this reuse, a pointer that the FPA returns (hereinafter pushes) to the logical stack (stacked address pointer, (SAP)) must again point to the base address of the buffer so that it may be allocated later to another entity.

As known in the art, according to one method, the RAP is a pointer to the base address of the buffer to be freed. This allows the FPA to push the pointer to the RA directly onto the logical stack, in other words the pointer to the RA is the same as the SAP. The problem with this method is that a returning entity may have only an "opaque pointer" that points to an address somewhere inside a buffer to be freed and not to the beginning of the buffer. Consequently, the entity may not know how to properly compute RA. Furthermore, if the returning entity does know how to compute the pointer to the RA, in a system in which the FPA has a plurality of logical stacks of different sizes, the returning entity may have to keep track of the logical stack from which the pointer was assigned and, consequently to which the pointer has to be returned, and perform the calculation differently for each of the plurality of the logical stacks.

According to another method, the RAP is a pointer to an address somewhere within the buffer to be freed. When such a RAP is returned an entity, i.e., a software layer, may have to keep track of the logical stack from which the pointer was assigned and, consequently to which the pointer has to be returned, and further perform a calculation translating the RAP back to SAP differently for each of the plurality of the logical stacks. Such a method costs instructions, and hardware area may be required to store and send variables keep track of a logical stack between hardware entities until it finally reaches the FPA. Accordingly, there is a need in the art for a method and an apparatus embodying the method, providing a solution to the above identified problems, as well as additional advantages.

SUMMARY

In an aspect of the disclosure, an apparatus and a method for memory address alignment according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
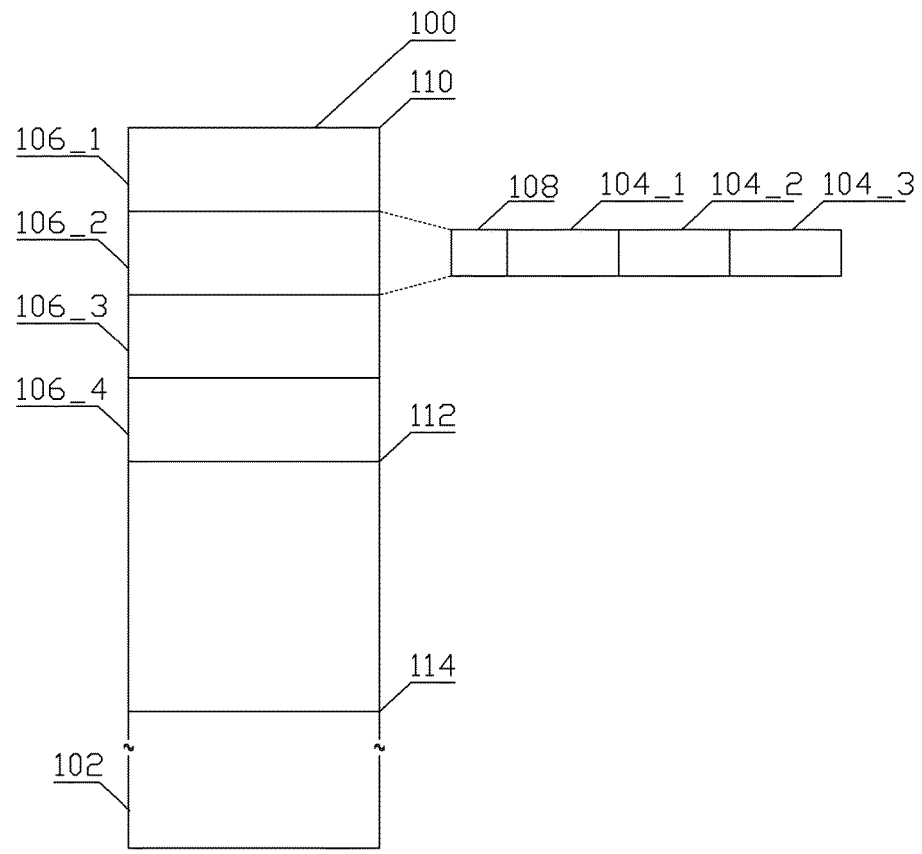
FIG. 1 depicts a conceptual data structure comprising a logical stack for a free pointer pool constructed by a free page allocator (FPA) in accordance with an aspect of this disclosure.
Figure 2:
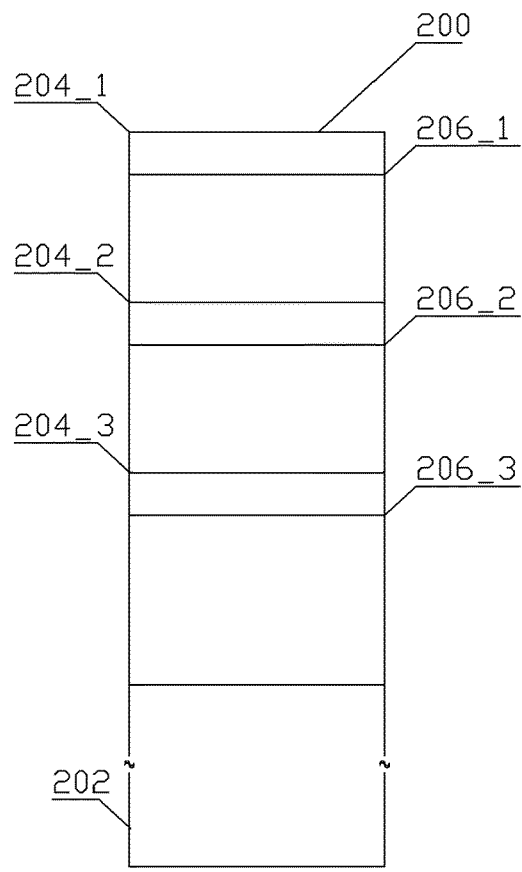
FIG. 2 depicts an exemplary structure of naturally aligned plurality of buffers in accordance with an aspect of this disclosure.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. Different instances of the same reference are distinguished by number appended to a reference, i.e., 100_1. Any unreferenced double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an" and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1 depicts a conceptual data structure comprising a logical stack 100 that a free page allocator (FPA) hardware builds in memory 102 to contain a plurality of pointers 104. The pointers 104 are pushed to the logical stack 100, i.e., written to the appropriate portion of the memory 102, and popped from the logical stack 100, i.e., read from the appropriate portion of the memory 102, in pages 106; each page being a block of memory of a predetermined size. In one embodiment, the page size is 128 bytes. There may be a plurality of such logical stacks, to provide quality of service, virtualization, or other features known to a person having ordinary skills in the art. The logical stacks are organized in a non-overlapping manner.

As depicted, a plurality of pointers 104, protected by a cyclic redundancy check (CRC) 108 is contained in a page 106. The number of the plurality of the pointers 104 depends on the size of the page 106, and the size of the pointers. In an aspect, the size of the pointers is 35 bits, thus allowing 29 pointers to be written to a 128 byte page, leaving 9bits for CRC.

The first page of pointers is written to a stack base address 110, identifying the beginning of a logical stack 100. The stack size is delimited by a stack end address 114. The location of the next free page into which pointers may be written is identified by a stack address 112. The size of the memory 102 dedicated for each logical stack, delimited by the stack base address 110 and the stack end address 114 is assigned by a software of a device containing the FPA.

To achieve a goal of addressing the problems of prior art, a certain requirements are imposed by the FPA to all pointers in a logical stack in accordance with an alignment of buffers to be pointed to by the pointers.

FIG. 2 depicts an exemplary structure 200 of naturally aligned plurality of buffers. Natural alignment is one which the starting address of the buffer modulo the size of the buffer is zero. Such a starting address is called a naturally aligned base address. Thus a buffer comprises a space in the memory 202, delimited by a naturally aligned base address 204 and having a specified size.

The structure 200 is initialized in a memory 202 from configuration parameters initialized by a software of a device implementing the FPA There may be a plurality of such structures 200, each such structure being associated in one of the plurality of logical blocks, i.e., logical blocks 100 of FIG. 1. In other words, a logical block 100 of FIG. 1 contains pointers to the buffers in the structure 200. The configuration parameters are held in a configuration parameter structure. In one aspect, the configuration parameter structure may comprise at least one register.

In an aspect, a configuration parameter comprises a buffer size (BS) expressed in, e.g., bytes or a constant multiple of bytes, which specifies a size of all the buffers in the structure 200. In an aspect, the multiple of bytes comprises 128 bytes, and the maximum buffer size is 1 MB. Another configuration parameter comprises a buffer offset (BO), a signed offset, which specifies a difference in, e.g., bytes or the constant multiple of bytes between the pointer to naturally aligned base address 204 and the pointer to a stack address identifying the start of the buffer 206. The purpose of the offset is to accommodate need of some software layers tracking the use of the buffers. The software layers may need an identifier at the top of each of the buffers; consequently, the offset reserves a space in the buffer for such a purpose. Therefore, when a software layer does not require an offset, in an aspect, the associated resources do not need to be implemented. In another aspect, the offset may be set to zero by setting the BO=0. An optional parameter natural alignment enable (NAE) indicates, whether the memory alignment disclosed is carried out, or whether a different manner of determining the address to be pushed on the logical stack is to be used, thus enabling compatibility. A person of ordinary skills in the art will understand that when such compatibility is not required, the NAE indicator, and associated resources as disclosed below do not need to be implemented.

Figure 3:
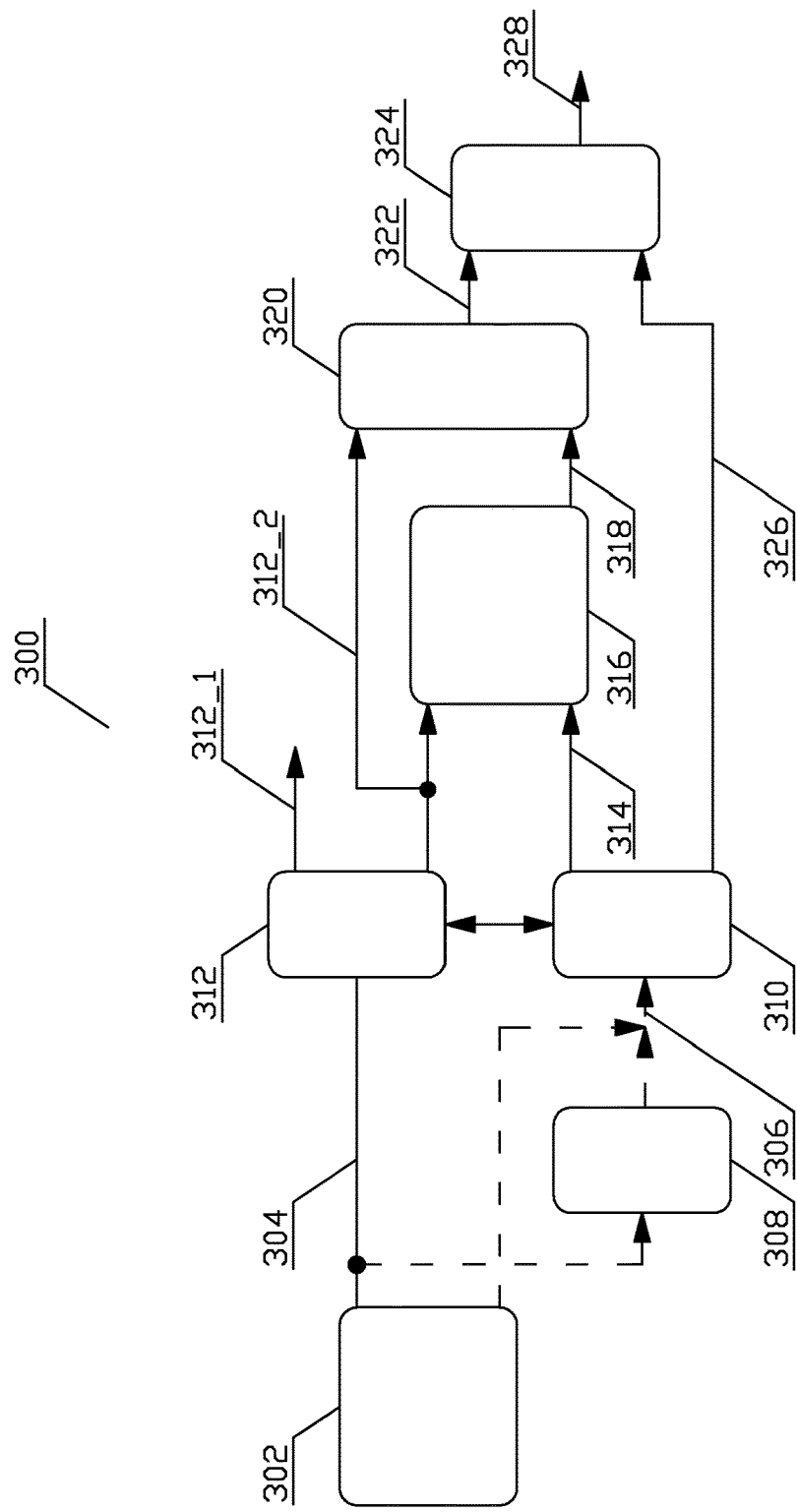
FIG. 3 depicts a block diagram of principal elements enabling memory address alignment in accordance with an aspect of this disclosure.

Referring now to FIG. 3, a block diagram 300 depicting principal elements depicted as blocks, enabling memory address alignment utilizing structure 200 of FIG. 2 is disclosed. The elements comprise hardware or software entities implementing the blocks and/or the block's functionality. To further clarify the relationship between elements of the block diagram 300 and of the structure 200, references to elements of the structure 200 are in parenthesis. Furthermore, for the purpose of giving a numerical example, it is assumed that the pool is configured with the following values: BS=256 bytes, BO=128 bytes, NAE=enable, and the address (204_1) of the start of the structure (200) in memory (202) is 0. A person having ordinary skills in the art will understand that other values may be used, therefore the example is by no means limiting.

A hardware or a software entity 302 that was assigned a stacked address pointer, e.g., address (206_2) of a second buffer in one of a plurality of structures (200), finished use of the buffer, and returns a return address pointer (RAP) 304 of the last addressed byte of the second buffer, e.g., RAP=520. In an aspect, the entity 302 further provides an identifier 306 of one structure, form the plurality of the structures (200), from which the pointer to the address (206_2) was assigned. In this aspect, the entity 302 is required to implement resources for retaining, or calculating the structure identifier 306. Therefore, in another aspect, the FPA stores the start and end addresses of each of the plurality of structures (200). Consequently, the structure identifier 306 is determined by the entity 302 providing the RAP 304 to an the FPA, which in block 308 compares the RAP 304 against the start and end address for each of the plurality of structures (200), which since a buffer cannot belong to a plurality of the structures (200), results in obtaining the structure identifier 306. This saves the entity 302 the resources for retaining or calculating the structure identifier 306. A person of ordinary skills in the art will understand that when a single structure 200 is contemplated, the identifier 306 of the structure and; consequently, associated resources do not need to be implemented.

The structure identifier 306 is provided to block 310, which stores the configuration of each of the plurality of the structures (200), i.e., the BS, the BO, and the optional NAE, and the configuration for the structure identified by the pool identifier 306 is retrieved.

If the NAE is set to a first value, the block 310 causes block 312 to provide the RAP 304 as an output 312_1, which is further processed with the principles disclosed in the background section.

Otherwise, if the NAE is set to a second value the processing continues and the BS 314 together with the RAP 304, provided by the second output 312_2 of block 312, are provided to block 316, which calculates a reminder 318 of a modulo operation of the RAP 304 taken as dividend and the BS 314 taken as a divisor; in mathematical notation:

$$\text{remainder} = \text{RAP} \bmod \text{BS} \quad \text{Equation (1)}$$

In an aspect, the modulo operation is carried out in a pipeline manner, whereby one bit of the RAP 304 is used each cycle of the clock of the FPA hardware to compute each bit of remainder 318. At the end of the pipeline the reminder is available. Thus continuing with the numerical example and substituting RAP=520 and BS=384 into Equation (1) yields:

$$\text{remainder} = 520 \bmod 384 = 136 \quad \text{Equation (2)}$$

In block 320, the remainder 318 is subtracted from the RAP 304, yielding a pointer to a naturally aligned base address 322, for the buffer used, i.e., the address (204_2) of the second buffer. Thus in the numerical example the naturally aligned base address (204_2) =520 −136 =384.

In block 324, the BO 326 is added to the naturally aligned base address 322 to yield a stacked address pointer (SAP) 328, i.e., the address (206_2). Thus in the numerical example the SAP 326 =348 +128 =512. The SAP 328 is then pushed on the logical stack 100 of FIG. 1 associated with the structure (200) identified by the structure indicator identifier 306.

Thus the above disclosed structure enables the entity to return an address (RA) that may point anywhere inside the buffer, while not requiring that entity to know the buffer size, and while also allowing any arbitrary buffer size, not being limited to buffer size of power of two.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein. Thus a person of ordinary skills in the art will understand that other naturally aligned plurality of buffers. structures are within the scope of the disclosure, i.e., structures where the buffers are not concatenated, structures where the size of buffers varies within the structure, and other structures satisfying the natural alignment as disclosed supra, and will be able to properly change the configuration parameters. Furthermore, such a person would understand that any other mathematical methods yielding the same result as the disclosed modulo arithmetic, e.g., multiplication followed by truncation, are contemplated.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for a memory address alignment comprising:
   configuring one or more structure(s) of naturally aligned plurality of buffers;
   providing a return address pointer in a buffer of one of the one or more structure(s) of naturally aligned plurality of buffers;
   determining a configuration of the one of the one or more structure(s) of naturally aligned plurality of buffers;
   calculating a remainder as the pointer of the return address modulo the parameter specifying a buffer size;
   subtracting the calculated remainder from the return address pointer to yield a naturally aligned base address; and
   providing a stacked address pointer determined in accordance with the applied modulo arithmetic.

2. The method as claimed in claim 1, wherein the configuring one or more structure(s) of naturally aligned plurality of buffers comprises:
   initializing for each of the one or more structure(s) of naturally aligned plurality of buffers one or more configuration register(s), wherein one of the one or more configuration registers specifies a size of a buffer; and
   configuring one or more structure(s) of naturally aligned plurality of buffers in accordance with the specified size.

3. The method as claimed in claim 2, wherein the initializing further comprises:
   initializing an additional one of the one or more configuration registers specifying a buffer offset; and
   the configuring comprises configuring one or more structure(s) of naturally aligned plurality of buffers in accordance with the specified size and the specified buffer offset.

4. The method as claimed in claim 1, wherein the determining a configuration of the one of the one or more structure(s) of naturally aligned plurality of buffers comprises:
   determining a configuration of the one of the one or more structure(s) of naturally aligned plurality of buffers in accordance with the provided return address pointer.

5. The method as claimed in claim 1, wherein the determining a configuration of the one of the one or more structure(s) of naturally aligned plurality of buffers comprises:
   determining a configuration of the one of the one or more naturally aligned buffer structure by providing an identifier of the one of the one or more structure(s) of naturally aligned plurality of buffers.

6. The method as claimed in claim wherein the providing a stacked address pointer determined in accordance with the applied modulo arithmetic comprises:
   providing a return address pointer to a naturally aligned base address when no buffer offset is specified in the determined configuration.

7. The method as claimed in claim 1, wherein the providing a stacked address pointer determined in accordance with the applied modulo arithmetic comprises:

providing a sum of a naturally aligned base address and a buffer offset specified in the determined configuration.

8. An apparatus for memory address alignment, comprising:
one or more structure(s) of naturally aligned plurality of buffers;
a returning entity configured to provide a return address pointer in a buffer of the one or more structure(s) of naturally aligned plurality of buffers; and
a hardware or software entity configured to:
determine a configuration of the one of the one or more structure(s) of naturally aligned plurality of buffers;
calculate a reminder of the pointer of the return address modulo the parameter specifying a buffer size;
to subtract the calculated modulo from the return address pointer to yield a naturally aligned base address; and
provide a stacked address pointer determined in accordance with the applied modulo arithmetic.

9. The apparatus as claimed in claim 8, wherein each of the one or more structure(s) of naturally aligned plurality of buffers comprises:
a plurality of buffers having a specified size.

10. The apparatus as claimed in claim 9, wherein the specified size is different for each buffer in the plurality of buffers.

11. The apparatus as claimed in claim 8, wherein each buffer in at least one of the plurality of buffers comprises a specified buffer offset.

12. The apparatus as claimed in claim 8, wherein the hardware or software entity determines the configuration of the one of the one or more structure(s) of naturally aligned plurality of buffers in accordance with the provided return address pointer.

13. The apparatus as claimed in claim 8, wherein the hardware or software entity determines the configuration of the one of the one or more structure(s) of naturally aligned plurality of buffers by being configured to:
receive from the returning entity an identifier of the one of the one or more structure(s) of naturally aligned plurality of buffers; and
to determine the configuration of the one of the one or more structure(s) of naturally aligned plurality of buffers in accordance with the received identifier.

14. The apparatus as claimed in claim 8, wherein the hardware or software entity provides the stacked address pointer determined in accordance with the applied modulo arithmetic by being configured to:
provide a return address pointer to the naturally aligned base address when no buffer offset is specified in the determined configuration.

15. The apparatus as claimed in claim 8, wherein the hardware or software entity provides the stacked address pointer determined in accordance with the applied modulo arithmetic by being configured to:
provide a sum of the naturally aligned base address and a buffer offset specified in the determined configuration.

\* \* \* \* \*